Patented Jan. 26, 1932

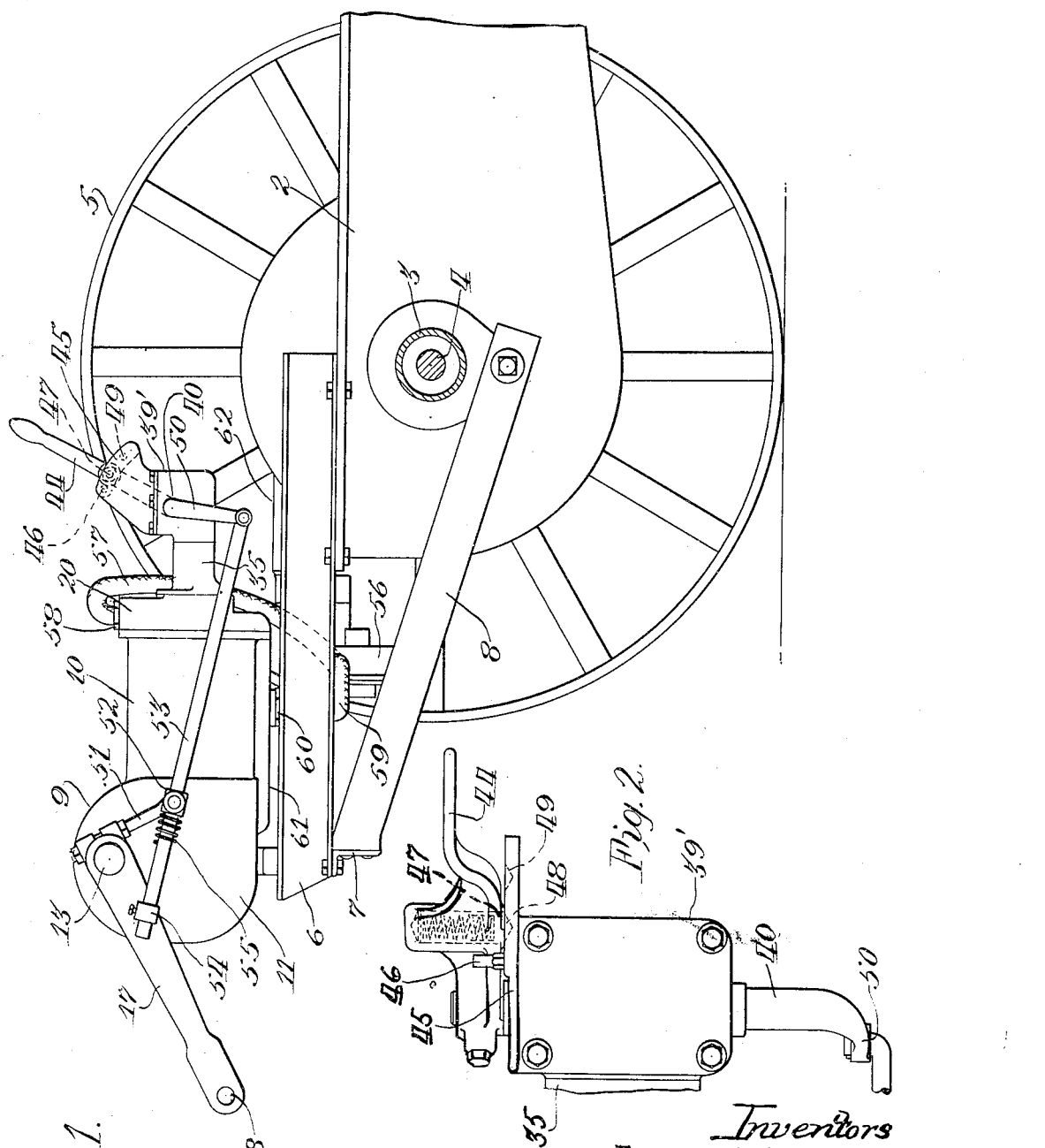

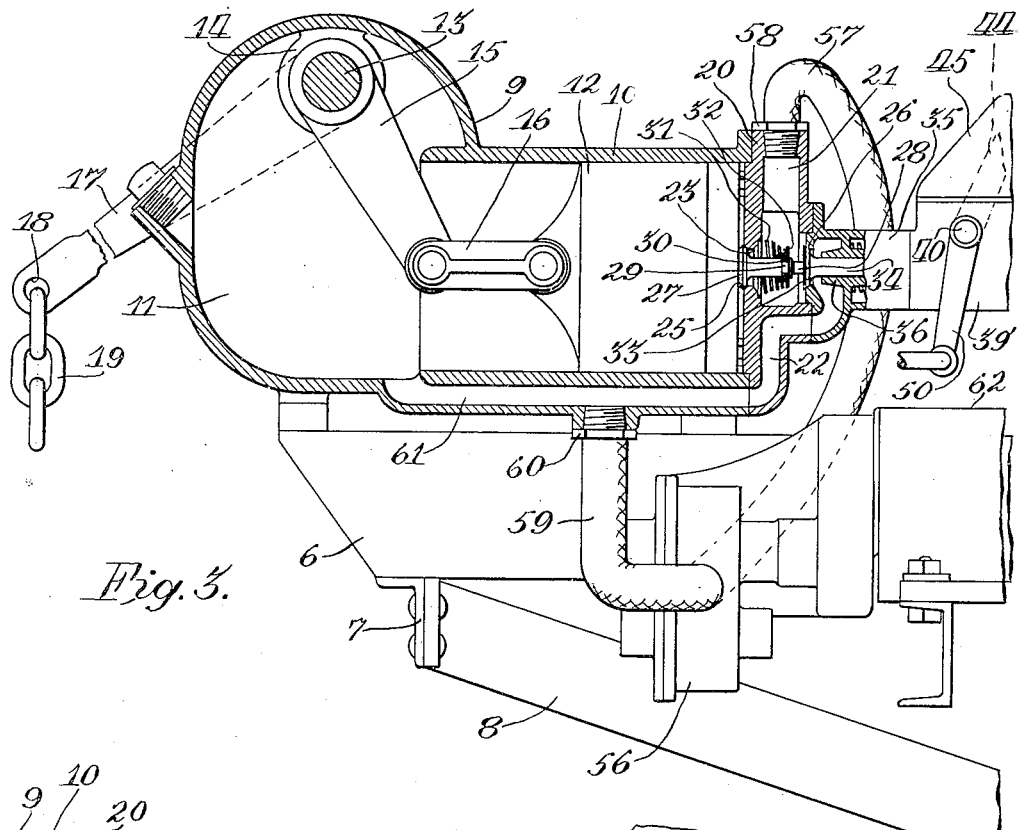
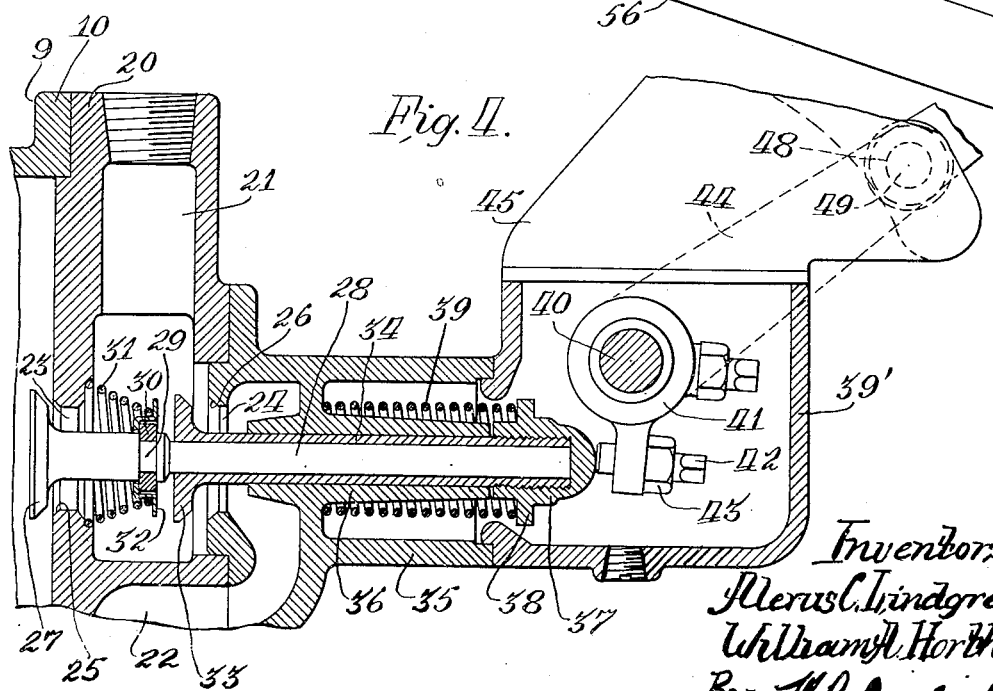

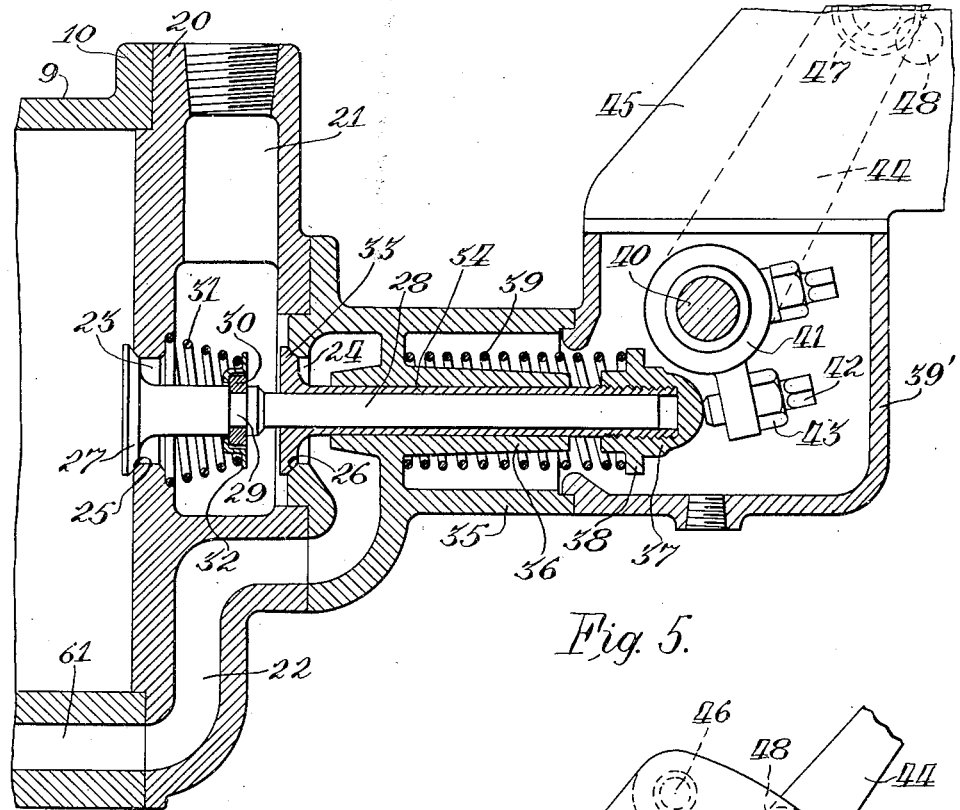
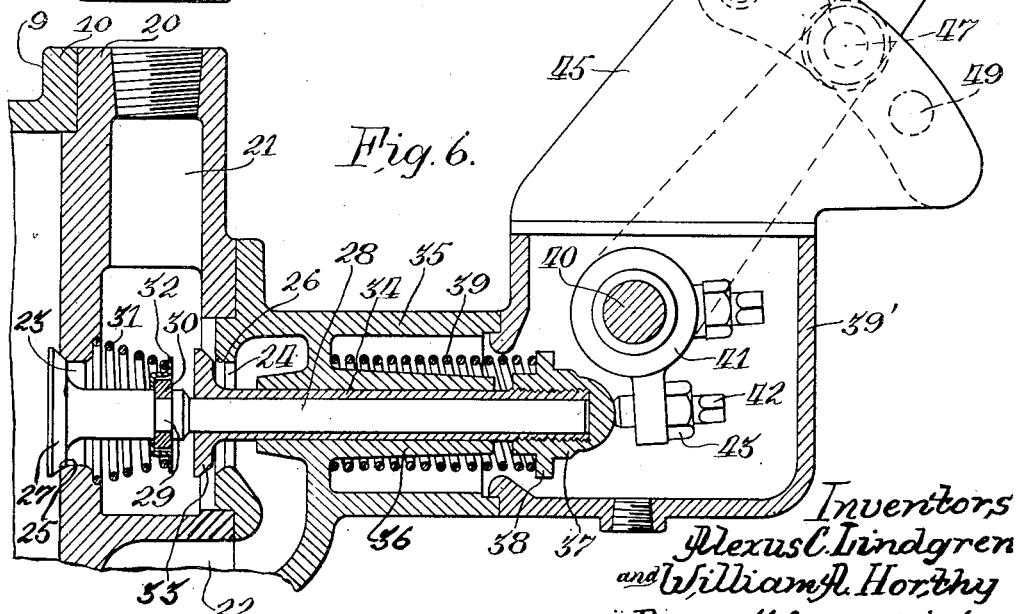

1,842,790

UNITED STATES PATENT OFFICE

ALEXUS C. LINDGREN AND WILLIAM A. HORTHY, OF CHICAGO, ILLINOIS, ASSIGNORS TO INTERNATIONAL HARVESTER COMPANY, A CORPORATION OF NEW JERSEY

HYDRAULIC POWER LIFT ATTACHMENT FOR TRACTORS

Application filed July 9, 1930. Serial No. 466,793.

This invention relates to a hydraulic lift particularly adapted for use on tractors.

The object of the invention is to provide an improved hydraulic lift embodying a novel valve arrangement for positive control of the fluid operating the hydraulic plunger.

Another object is to provide a hydraulic lift particularly adaptable for mounting on a tractor and for being operated from the tractor power take-off.

Another object is to provide an automatic throwout device to by-pass the operating liquid when the hydraulic plunger has reached the end of its stroke.

These objects and others, which will be apparent, are attained by the arrangement and operation of elements as shown in the drawings, in which:

Figure 1 is a side elevation of the rear end of a tractor with a hydraulic lift embodying the invention mounted thereon;

Figure 2 is an enlarged plan view of the valve operating lever;

Figure 3 is a cross sectional view of the principal parts of the hydraulic lift, the associated elements being shown in plan;

Figure 4 is an enlarged cross section of the valve arrangement with both valves open, that is, with the valves set for the low position of the lifting arm;

Figure 5 is a similar view, showing both valves closed; (the valves are in this position at the beginning of the lifting stroke of the hydraulic plunger); and, Figure 6 is a similar view, showing the valves in a neutral position, that is, with the operating liquid being by-passed, the plunger remaining in whatever position it happened to be in when the operating lever was shifted to neutral position.

The tractor, a portion of which is shown in Figure 1, is of the type having a cast main frame 2, to which housings 3 are attached for carrying the axle 4 on which wheels 5 are mounted. A pair of channel bars 6, only one of which can be seen in the elevational view, are rigidly bolted to the frame and extend rearwardly to form a supporting platform for the hydraulic device. A transverse bar 7 is bolted to the rear ends of the bars 6. Bracing bars 8 extend angularly downward from the bar 7 and are attached to a portion of the housing 3. An integral casting 9 forms a horizontally positioned cylinder 10 and a combined crank case and liquid reservoir 11 extending rearwardly and upwardly from the cylinder 10. The casting 9 is rigidly secured to the channel bars 6. A plunger 12 is mounted for reciprocation in the cylinder 9. A shaft 13 extends through the upper portion of the crank case 11 and is mounted in suitable bearings 14. A crank 15 is splined to the shaft 13 and extends downwardly to a point substantially in alignment with the axis of the cylinder 12. A link 16 is pivotally attached to the crank 15 and the cylinder 12, forming a connecting rod for oscillating the crank 15. Outside the crank case 11, a lifting arm 17 is rigidly secured to the end of the shaft 13. At the outer end of the arm 17, a hole 18 is provided for attaching a chain 19 or other elements for attaching to a load or implement to be lifted.

A cored head 20 is secured to the end of the cylinder 9. A liquid supply chamber 21 is formed in the head and a by-pass chamber 22. The liquid supply communicates with the cylinder by means of a centrally located opening 23 and with the by-pass chamber 22, by means of an opening 24. The opening 24 is in axial alignment with the opening 23.

A valve seat 25 is provided on the cylinder side of the opening 23, and similarly a valve seat 26 is formed on the supply chamber side of the opening between the supply chamber and the by-pass chamber. A valve 27 is adapted to fit against the seat 25 with its stem 28 extending centrally through the opening 24. An annular recess 29 is provided in the valve stem 28 to receive a split collar 30. A compression spring 31 fits around the opening 23 on the supply chamber side thereof and against a retainer flange 32 fitted around the collar 30. A second valve 33 is adapted to fit against the seat 26. The stem 34 of the valve 33 is provided with a bore through which the stem 28 extends in slidable relation with respect to the stem 34. A casting 35, valve guide 36 through which the hollow stem 34 extends. A cap 37 is threaded on the end of the stem 34. A flange 38 on the cap 37 provides a seat for a compression spring 39, which holds the valve 33 in a seated position. As shown in Figure 5 where both valves are seated, the valve stem 28 does not extend the full length of the hollow stem 34, leaving a space, the distance through which the valve 33 may be moved before pressure is applied to the valve 27.

A casting 39′, rigidly secured to the casting 35, forms a support and housing for the valve actuating means. A shaft 40 extends through the casting 39′. Inside the casting, a short crank 41 is secured to the shaft 40. A threaded screw 42 and a lock nut 43 provide means for adjusting the operation of the valves with respect to the movement of the actuating lever 44. The lever 44 is rigidly secured to the shaft 40 outside the casting 39′.

An upwardly extending member 45, rigidly secured to the casting 39′, is provided with a stop 46 for limiting the movement of said lever in one direction. A spring pressed latch 47 is provided on the lever 44 for engaging depressions 48 and 49 in the member 45. On the shaft 40 opposite the lever 44, a crank 50 is secured. A crank 51 is also provided, rigid with respect to the lifting arm 17. In the particular construction shown, the crank 51 is an extension of the means utilized for clamping the arm 17 on the shaft 13. A block 52 is pivotally mounted on the crank 51. A link 53, pivotally attached to the lever 50, slidably extends through a bore in the block 52. An adjustable stop 54 is mounted on the end of the link 53 beyond the slidable block. A spring 55 is mounted on the link between the stop and the block 52.

A pump of a conventional gear type is mounted in a housing 56. A flexible, high pressure supply line 57 leads from the outlet side of the pump to the supply chamber 21 and is secured thereto by a fitting 58. The inlet side of the pump is connected by a flexible supply line 59 and a fitting 60 to the underneath side of the casting 9 in communication with a cored conduit 61 extending from the combined reservoir and crank case 11 to the by-pass chamber 22. The pump is adapted to be driven by the tractor power take-off shaft 62.

In the operation of this device, the power take-off shaft is put into operation and the pump is operated continuously, drawing in oil or other liquid, which may be used through the feed line 59, and delivering it through the supply line 57 into the supply chamber 21.

With the actuating lever 44 in neutral position, that is, with the latch 47 engaging the depression 48, the screw 42 is adjusted so that the valve 33 is held in open position. In this position, the cap 37 comes practically into contact with the end of the stem 28, but does not open the valve 27. The liquid by-passed into the chamber 22 returns through the cored conduit 61 into the reservoir.

Assuming that the lifting arm 17 is in downward position with the plunger 12 at the upward end of its stroke, a movement of the actuating lever 44 against the stop, as shown in Figure 5, will close the valve 33. Both valves will then be in closed position. The pump builds up pressure in the supply chamber 21 with the result that the valve 27 is opened against the pressure of the spring 31. The plunger is moved outwardly away from the head, and the arm 17 is lifted. When the arm has been lifted to the desired height the lever 44 may be returned to the neutral position with the result that liquid will then be by-passed and the valve 27 will seat, holding the arm 17 in whatever position it has attained. If, for any reason, the lever 44 is held against the stop 46 until the arm 17 has reached the top of its stroke, the slidable block 52 comes into engagement with the stop 54 and automatically returns the actuating lever to the neutral position.

When the lifting arm 17 is in raised position and is to be lowered, the lever 44 is moved with the latch 47 into engagement with the depression 49. In this position, as illustrated in Figure 4, the cap 37 engages the head of the stem 28 and opens the valve 27, as well as the valve 33. Liquid from the cylinder then flows out from the openings 23 and 24 into the by-pass chamber 22 and back to the reservoir.

It is to be understood that applicants have shown only one preferred embodiment of their device and that they claim as their invention all modifications falling within the scope of the appended claims.

What is claimed is:

1. A hydraulic lift comprising a cylinder, a plunger mounted for reciprocation in the cylinder, a supply chamber communicating with the cylinder, a by-pass chamber communicating with the supply chamber, the communication being provided by aligned openings formed in the walls of said chambers, a valve adapted to control liquid flow to and from the cylinder, said valve being seated on the cylinder side of the opening between the cylinder and the supply chamber and having the stem extending through the aligned opening and through a wall of the by-pass chamber, a by-pass valve having a hollow stem slidably mounted on the stem of the first named valve and being adapted to control the flow of fluid from the supply chamber to the by-pass chamber, a cap secured to the end of the hollow stem and adapted to engage the other stem after a predetermined distance of movement, and operating means adapted to engage said cap.

2. A hydraulic lift comprising a cylinder, a plunger mounted for reciprocation in said cylinder, a crank case rigidly connected to the cylinder, a shaft extending through said crank case, a connecting rod joining said crank shaft with the plunger, a lifting arm rigidly secured to said shaft, a liquid reservoir, a pump connected with said reservoir, a head for the cylinder containing a liquid supply chamber communicating with the cylinder and a by-pass chamber communicating with the supply chamber, the communications being formed by aligned openings in the walls of said chambers, a valve seating on the cylinder side of the opening between the cylinder and the supply chamber, the stem of said valve extending centrally through the other opening, a spring adapted to resiliently hold said valve in closed position, a hollow stem valve slidably mounted on the stem of the first named valve, the second valve seating on the supply chamber side of the opening between the supply chamber and the by-pass chamber, means for holding said valve yieldably in closed position, a cap secured to the hollow valve stem and adapted to engage the inside stem after a predetermined movement of the cap, and means for operating the hollow stem valve alone and both of said valves together.

In testimony whereof we affix our signatures.

ALEXUS C. LINDGREN.
WILLIAM A. HORTHY.